US009728305B2

(12) United States Patent
Kumar et al.

(10) Patent No.: US 9,728,305 B2
(45) Date of Patent: Aug. 8, 2017

(54) APPARATUS FOR ELECTRIC STRESS GRADING WITH WILDLIFE GUARD FOR ELECTRICAL POWER DISTRIBUTION EQUIPMENT

(71) Applicant: Tyco Electronics Corporation, Berwyn, PA (US)

(72) Inventors: Senthil A. Kumar, Morrisville, NC (US); Laura Jackson Hiller, Cary, NC (US); David Edwin Bowling, Fuquay-Varina, NC (US); Luis Puigcerver, Cary, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/064,845

(22) Filed: Mar. 9, 2016

(65) Prior Publication Data

US 2016/0268022 A1    Sep. 15, 2016

Related U.S. Application Data

(60) Provisional application No. 62/131,408, filed on Mar. 11, 2015.

(51) Int. Cl.
| *H01B 17/42* | (2006.01) |
| *H01B 17/00* | (2006.01) |
| *H01T 19/02* | (2006.01) |
| *H02G 3/30* | (2006.01) |
| *H02G 7/00* | (2006.01) |

(52) U.S. Cl.
CPC .............. *H01B 17/42* (2013.01); *H01B 17/00* (2013.01); *H01B 17/005* (2013.01); *H01T 19/02* (2013.01); *H02G 3/24* (2013.01); *H02G 7/00* (2013.01)

(58) Field of Classification Search
CPC .............................. H01B 17/42; H01B 17/005
USPC ............................................ 174/74 R, 137 R
See application file for complete search history.

(56) References Cited

U.S. PATENT DOCUMENTS

| 5,191,857 A * | 3/1993 | Boaz ................. A01K 39/0113 |
| | | 119/52.3 |
| 5,299,528 A | 4/1994 | Blankenship |
| 5,392,732 A | 2/1995 | Fry |
| 5,682,015 A | 10/1997 | Harben |
| 5,864,096 A * | 1/1999 | Williams ............... H01B 17/00 |
| | | 174/139 |
| 5,992,828 A | 11/1999 | Burdick |

(Continued)

*Primary Examiner* — Timothy Thompson
*Assistant Examiner* — Charles Pizzuto
(74) *Attorney, Agent, or Firm* — Myers Bigel, P.A.

(57) ABSTRACT

An apparatus for mounting at a conductive terminal of a high voltage insulator is provided. An apparatus includes an electrical insulator including an electrically insulating material without a conductive material. The electrical insulator includes a first surface, a second surface, a first edge that is between the first surface and the second surface, an intersection between the first edge and the first and second surfaces, and a second edge that is opposite the first edge and that is between the first surface and the second surface. The apparatus further includes a connected electrical conductor that is arranged on the first surface of the electrical insulator and is spaced apart from the second edge and an electrically conductive connector that is configured to electrically couple the connected electrical conductor to the conductive terminal of the high voltage insulator.

20 Claims, 9 Drawing Sheets

(56) References Cited

U.S. PATENT DOCUMENTS

| | | |
|---|---|---|
| 6,125,595 A | 10/2000 | Showalter |
| 6,248,956 B1* | 6/2001 | Cook ................... H02G 7/00 |
| | | 174/154 |
| 6,453,775 B1 | 9/2002 | Dietrich et al. |
| 6,571,517 B2 | 6/2003 | Wulff et al. |
| 6,817,138 B1 | 11/2004 | McGill et al. |
| 6,925,748 B2 | 8/2005 | McGill et al. |
| 6,948,452 B2 | 9/2005 | Wolfgram |
| 7,191,735 B2 | 3/2007 | Wolfgram |
| 7,481,021 B2 | 1/2009 | Riddell |
| 7,679,000 B2 | 3/2010 | Rauckman |
| 8,196,340 B2 | 6/2012 | Donoho |
| 8,293,044 B1 | 10/2012 | Riddell |
| 8,424,238 B2 | 4/2013 | Donoho |
| 8,430,063 B1 | 4/2013 | Riddell |
| 8,434,209 B1 | 5/2013 | Riddell |
| 2007/0131447 A1* | 6/2007 | Rauckman ............ H01B 17/00 |
| | | 174/135 |
| 2008/0066948 A1* | 3/2008 | Rauckman ............ H01B 17/00 |
| | | 174/135 |
| 2013/0220695 A1* | 8/2013 | Hiller ................... H01B 17/00 |
| | | 174/5 R |

* cited by examiner

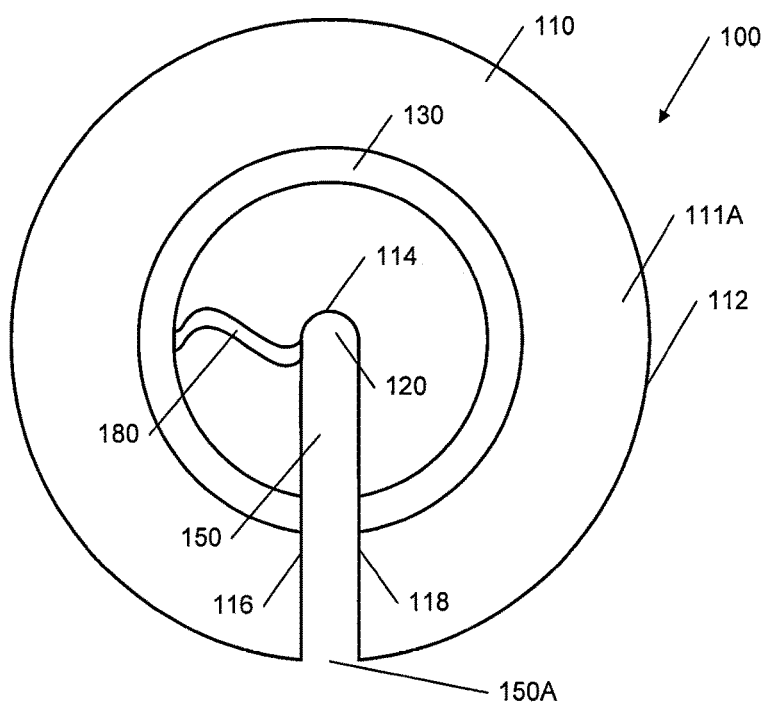
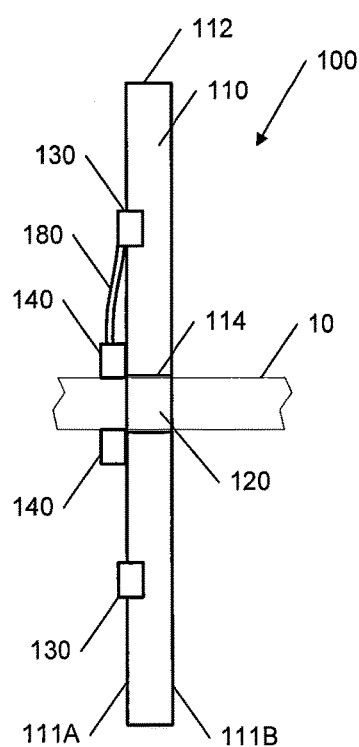
FIG. 2A
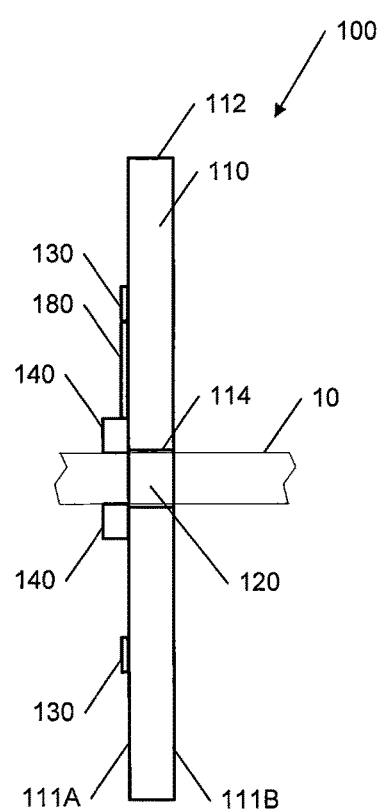
FIG. 2B

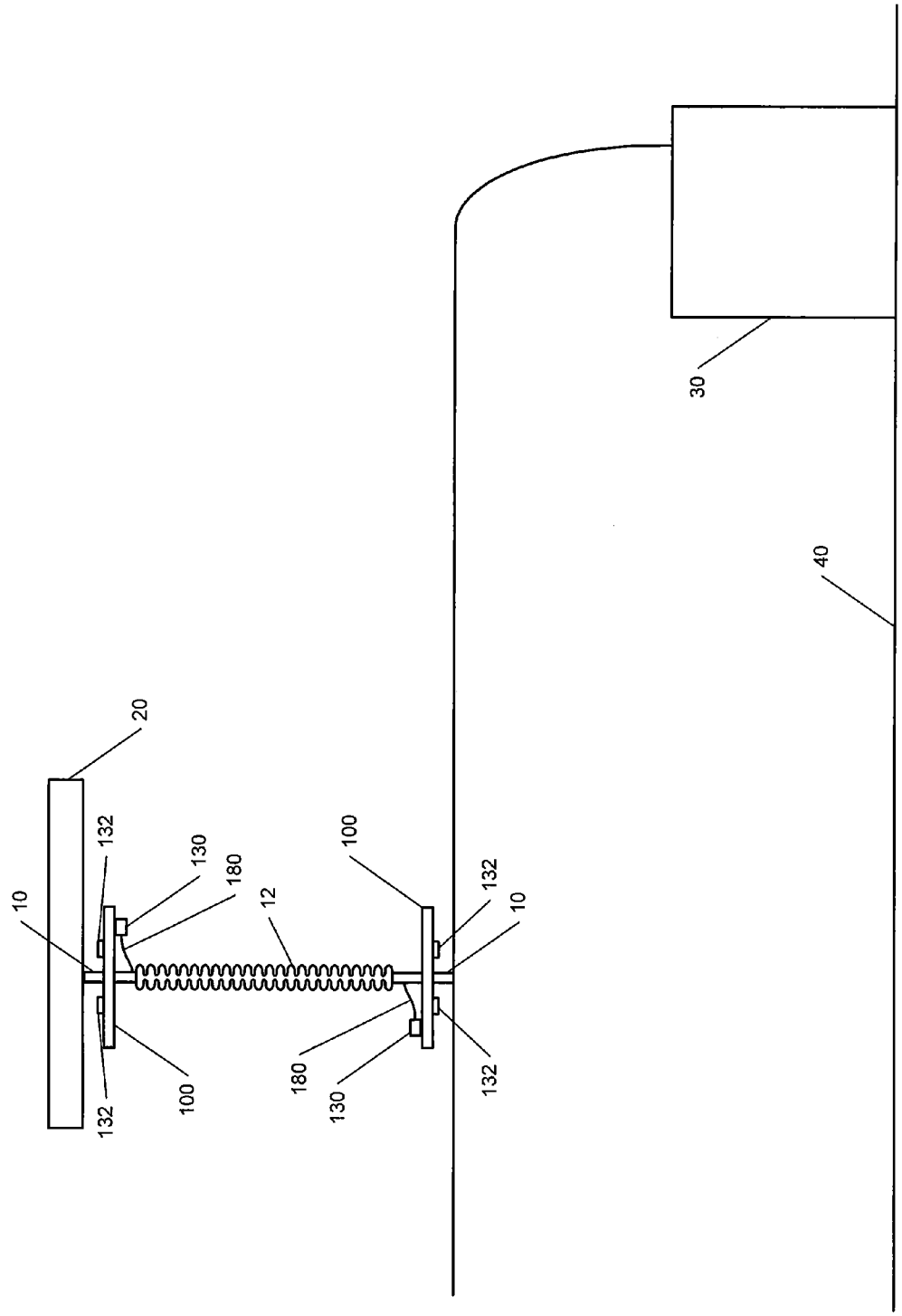

APPARATUS FOR ELECTRIC STRESS GRADING WITH WILDLIFE GUARD FOR ELECTRICAL POWER DISTRIBUTION EQUIPMENT

RELATED APPLICATIONS

The present patent application claims priority to U.S. Provisional Application No. 62/131,408, filed Mar. 11, 2015 and entitled Apparatus For Electrical Stress Grading With Wildlife Guard For Electrical Power Distribution Equipment, the disclosure of which is hereby incorporated herein by reference as if set forth fully herein.

BACKGROUND

High voltage electrical distribution equipment may generate an electric field gradient that may result in corona. Corona may result when the electric field in air is strong enough to strip some electrons from the atoms and cause the air to become a conductive plasma. In particular, when a high voltage object includes surfaces having a small curvature or sharp points and/or edges, the electric field strength may be high enough to generate a corona.

Corona rings, which may also be referred to as field stress grading rings, are electrically conductive rings, or parts thereof that may be placed at the high voltage end of electrical insulators and may be positioned substantially orthogonally relative to the conductor. The corona rings may function to modify the shape of the electric field intensity so that the peak rate of change of field on the electrical insulator is reduced to a level that is below the breakdown voltage of the surrounding air.

Distribution and substation equipment used to supply electrical power have used wildlife protection to prevent wildlife from simultaneously contacting energized and grounded surfaces and/or adjacent phases. When such contact occurs, short circuits and consequent power outages frequently may be the result. The wildlife protection may be typically applied to an equipment bushing or lightning arrester of the distribution or substation equipment. For adequate protection, a number of presently available wildlife guards have also required an insulated or covered wire between the bushing and arrester.

Available wildlife guards have posed problems because they only attempt to deter the animal from simultaneously touching a grounded surface and an energized surface. Such guards do nothing to prevent an animal from climbing on the equipment entirely. As a result, because the animal is not deterred from staying away from the equipment entirely, the animal may still find a way to simultaneously touch energized and grounded surfaces. Additionally, the animals, particularly squirrels, have a tendency to chew on prior art wildlife guards. As such, effective wildlife guards are desired.

Multiple different types of devices, each directed to addressing different issues that arise in electrical power distribution systems may, in aggregate, increase the overall system complexity and thus may be costly.

SUMMARY

Some embodiments of the present invention are directed to an apparatus for mounting at a conductive terminal of a high voltage insulator. The apparatus may include an electrical insulator including an electrically insulating material without a conductive material. The electrical insulator may include a first surface, a second surface that is opposite the first surface, a first edge that is between the first surface and the second surface, an intersection between the first edge and the first and second surfaces defining outer edges of the first and second surfaces, respectively, and a second edge that is opposite the first edge and that is between the first surface and the second surface, an intersection between the second edge and the first and second surfaces defining interior edges of the first and second surfaces, respectively. The apparatus may further include a connected electrical conductor that is arranged on the first surface of the electrical insulator and is spaced apart from the second edge and an electrically conductive connector that is configured to electrically couple the connected electrical conductor to the conductive terminal of the high voltage insulator.

Some embodiments include a floating electrical conductor that is on the second surface and that is spaced apart from the second edge. In some embodiments, the first edge defines a first shape and the floating electrical conductor that is arranged on the second surface of the electrical insulator includes a second shape that is the same as the first shape.

Some embodiments provide that the interior edges of the electrical insulator define a central opening that is configured to receive the conductive terminal of the high voltage insulator.

In some embodiments, the first surface of the electrical insulator is substantially planar. Some embodiments provide that the first surface of the electrical insulator is substantially non-planar.

In some embodiments, the first edge defines a first shape that includes a circular and/or polygonal shape.

Some embodiments further include a clamping component that is attached to the electrical insulator proximate the interior edges of the first and second surfaces and that engages the conductive terminal of the high voltage conductor to maintain a position of the electrical insulator relative to the conductive terminal of the high voltage conductor.

In some embodiments, the electrical insulator further includes a third edge that is between a proximal end of the first edge and a proximal end of the second edge and that is between the first surface and the second surface and a fourth edge that is between a distal end of the first edge and a distal end of the second edge and that is between the first surface and the second surface. Some embodiments provide that a gap is formed between the third edge and the fourth edge and that the gap is in fluidic communication with a central opening that is defined by the interior edges of the electrical insulator. In some embodiments, the third edge overlaps the first surface and the second edge overlaps the second surface and the first surface is proximate the second surface in a portion between where the third edge overlaps the first surface and the second edge overlaps the second surface.

Some embodiments provide that the connected electrical conductor is on the first edge.

In some embodiments, the connected electrical conductor includes a metal strip that is attached to the first side of the electrical insulator. Some embodiments provide that the connected electrical conductor comprises a conductive plastic material. In some embodiments, the connected electrical conductor comprises a multiple strand electrical conductor. Some embodiments provide that the connected electrical conductor is a conductive coating that is applied to the first surface of the electrical insulator. In some embodiments, the electrically conductive connector comprises a multiple strand electrical conductor.

Some embodiments provide that the electrically conductive connector includes a clamping component that is attached to the electrical insulator proximate the interior edges of the first and second surfaces and that engages the conductive terminal of the high voltage conductor to maintain a position of the electrical insulator relative to the conductive terminal of the high voltage conductor. In some embodiments, the clamping component is electrically coupled to the connected electrical conductor.

Some embodiments provide that the first surface of the electrical insulator includes a first axially defined portion and a second axially defined portion and that the connected electrical conductor is arranged within the first axially defined portion without extending into the second axially defined portion. In some embodiments, the first axially defined portion includes an area including a range of about 30 percent of the first surface to about 70 percent of the first surface. Some embodiments provide that the first axially defined portion and the second axially defined portion include a total area of the first surface.

In some embodiments, the conductive terminal of the high voltage insulator includes a high voltage terminal. Some embodiments provide that the conductive terminal of the high voltage insulator includes a ground terminal.

In some embodiments, the electrical insulator includes a first insulator structure that includes the first surface and the second surface, a second insulator structure that includes the first surface and the second surface, and an insulator coupler that is configured to attach the first insulator structure to the second insulator structure. Some embodiments provide that the high-voltage electrical conductor is between the first insulator structure and the second insulator structure when the apparatus is installed thereon.

Further features, advantages and details of the present invention will be appreciated by those of ordinary skill in the art from a reading of the figures and the detailed description of the embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF DRAWINGS

The accompanying figures are included to provide a further understanding of the present invention, and are incorporated in and constitute a part of this specification. The drawings illustrate some embodiments of the present invention and, together with the description, serve to explain principles of the present invention.

FIG. 1 is front schematic view of an apparatus for electric stress grading with wildlife guard according to some embodiments of the present invention.

FIGS. 2A and 2B are each cross-sectional side views of the active electrostatic wildlife guard of FIG. 1 according to two different respective embodiments of the present invention.

FIG. 14 is an elevation schematic diagram illustrating some embodiments of the present invention in an application in which an apparatus disclosed herein may be used.

DETAILED DESCRIPTION

Figure 3A:
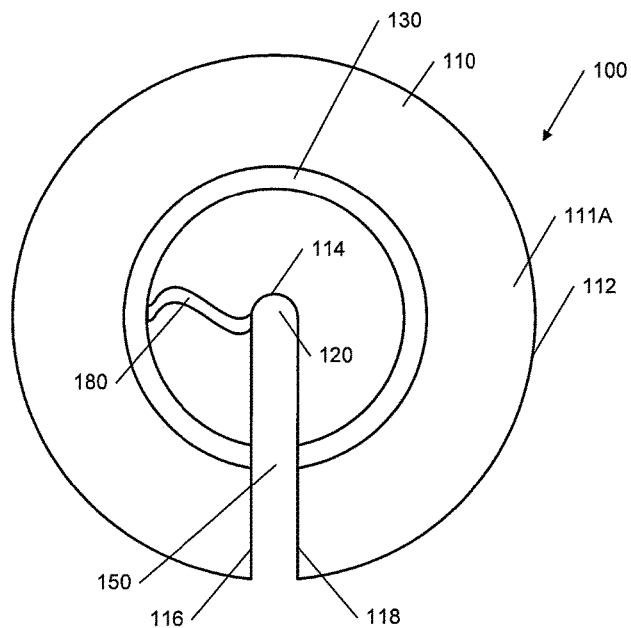
FIGS. 3A and 3B are front and rear schematic views, respectively, of an apparatus according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which some embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Reference is now made to FIG. 1, which is front schematic view of an apparatus for electric stress grading with wildlife guard according to some embodiments of the present invention, and to FIGS. 2A and 2B, which are each cross-sectional side views of the apparatus of FIG. 1 according to two different respective embodiments of the present invention.

A combined apparatus for electric stress grading with wildlife guard functionality ("multi-purpose guard") 100 may provide electrical stress grading to reduce and/or prevent corona and prevent and/or reduce the incursion of wildlife such as, for example, squirrels, onto electrical equipment via high voltage power lines connected to the electrical equipment. Some embodiments of the multi-purpose guard 100 include an electrical insulator 110, and a connected electrical conductor 130 that may be electrically coupled to a conductive terminal 10 on a high voltage insulator. Some embodiments provide that one or more electrically conductive connectors 180 may be used to couple the connected electrical conductor 130 to the conductive terminal 10.

Although discussed herein in the context of application to a high voltage insulator, embodiments described herein may be used on bushings, switchgear and/or other types of electrical power transmission and/or distribution apparatus. Some embodiments provide that embodiments herein may be useful for stress grading transmission, sub-transmission, and/or distribution power lines where multiple types and/or combinations hardware are used.

Some embodiments provide that the electrical insulator 110 is formed of an electrically insulating material. In some embodiments, the electrical insulator 110 may be substantially without electrically conductive materials embedded within the electrically insulating material.

Some embodiments provide that the electrical insulator 110 may be substantially planar and may include a first side and a second side that is substantially opposite the first side.

As described herein, the first side may correspond to a first surface 111A and the second side may correspond to a second surface 111B. In some embodiments, the electrical insulator 110 includes a first edge 112 that is between the first and second surfaces 111A, 111B and the defines outer edges thereof. Although the electrical insulator 110 is illustrated as being substantially circular in shape, the invention is not so limited. For example, the electrical insulator 110 may include a polygonal, elliptical, curvilinear and/or circular shape that maybe symmetrical and/or asymmetrical about one or more axes.

In some embodiments, the electrical insulator 110 may include a second edge 114 that is opposite the first edge 112 and/or a portion thereof. Some embodiments provide that the second edge 114 defined and/or partially defines interior edges of the first and second surfaces 111A, 111B that may define a central opening 120 this configured to receive a conductive terminal 10 of a high-voltage insulator.

In some embodiments, the electrical insulator 110 may include a third edge 116 between the first and second surfaces 111A, 111B and a fourth edge 118 that is between the first and second services 111A, 111B. The third edge 116 and the fourth edge 118 may define a gap 150 in the electrical insulator 110 that extends from the central opening 120 to the first edge 112, which may be the outer edge. In some embodiments, the gap 150 defines a conductor-receiving channel and/or slot extending radially from an entrance opening 150A at the first edge 112 to a central conductor seat that may be in the central opening 120. In this manner, the electrical insulator 110 may be in fluidic communication with the central opening 120 such that the conductive terminal 10 of the high-voltage insulator may be arranged in the central opening 120 via the gap.

The multi-purpose guard 100 may include a connected electrical conductor 130 that is arranged in the first surface 111A of the electrical insulator 110 and that is spaced apart from the second edge 114. When installed on a high voltage insulator, the connected electrical conductor 130 may be electrically coupled to a conductive terminal 10 on the high voltage insulator via one or more electrically conductive connectors 180. For example an electrically conductive connector 180 may electrically couple the connected electrical conductor 130 to the conductive terminal 10 of the high voltage insulator. As used herein and in the absence of additional qualifiers, electrical coupling and/or connection refers to a galvanic coupling which results from an electrically conductive coupling between respective elements.

In some embodiments, the connected electrical conductor 130 may include an electrically conductive material including a metallic material and/or a conductive composite such as an electrically conductive plastic. Some embodiments provide that the connected electrical conductor 130 may be substantially monolithic in that the composition of the floating electrical conductor 130 includes the same material throughout. Some embodiments provide that the connected electrical conductor 130 may be attached to the electrical insulator 110 via one or more mechanical fastening techniques and/or one or more adhesive and/or bonding techniques.

In some embodiments, the connected electrical conductor 130 may include a conductive sheet, foil, textile, fabric and/or other electrically conductive structures. In some embodiments, the connected electrical conductor 130 may be a conductive composition that may be applied to the electrical insulator 110 using a spraying, rolling, printing, making, dipping and/or other material deposition and/or coating techniques. Some embodiments provide that the connected electrical conductor 130 includes a multiple strand floating electrical conductor such as a conductive braid and/or stranded conductor.

As illustrated in FIG. 2A, the connected electrical conductor 130 may be positioned in one or more recesses, cavities and/or channels formed in the electrical insulator 110. According to some embodiments, as illustrated in FIG. 2B, the connected electrical conductor 130 may be positioned on the first surface 111A of the electrical insulator 110 in the absence of recesses, cavities and/or channels therein.

As provided above, some embodiments of the electrical insulator 110 may include shapes other than the circular shapes illustrated herein. In some embodiments, the connected electrical conductor 130 may be arranged on the first surface 111A of the electrical insulator 110 in a geometric shape corresponding to the shape of the electrical insulator 110. In some embodiments, the connected electrical conductor 130 may be substantially annular and may be substantially centered about the conductive terminal 10 of the high-voltage insulator when installed thereon. Some embodiments provide that the arrangement of the connected electrical conductor 130 is different from the geometric shape of the electrical insulator 110. For example, a desired smoothing of the electric field distribution may dictate a geometric shape that corresponds to the position of the connected electrical connector 130 relative to the conductive terminal 10 of the high voltage insulator.

In some embodiments, the connected electrical conductor 130 may be one or more elongated, thin strips of conductors. Some embodiments provide that the floating electrical conductor may have a ratio of width to thickness in a range of about 1:1 to about 100:1. In some embodiments, the connected electrical conductor 130 may include dimensions that correspond to different operating voltages and/or different positions relative to the high voltage insulator. For example, a connected electrical conductor 130 for placement on the high voltage terminal of a high voltage insulator may have a different dimension than a connected electrical conductor 130 for placement on a ground side of the high voltage insulator. For example, outer dimensions corresponding to a generally circular connected electrical conductor 130 may vary according to location and line voltage. Table 1 is provided below to provide examples of ring diameters corresponding to connected electrical conductors at different voltages. As provided therein, the ring diameters may vary depending on whether the ring is configured to be on a ground side of an insulator or a high voltage side of an insulator.

TABLE 1

| Operating Voltage (kV) | HV Side Ring Diameter (in.) | Ground Side Ring Diameter (in.) |
|---|---|---|
| <69 | 0.25-0.5 | 0.25-0.5 |
| 138 | 0.5-1.0 | 0.5-1.0 |
| 230 | 8 | 0.5-1.0 |
| 345 | 12 | 8 |
| 500 | 15 | 8 |
| 765 | 15-20 | 15-20 |

In some embodiments, the electrically conductive connector 180 comprises a multiple strand electrical conductor such as a cable or conductive strap or braid. Some embodiments provide that the electrically conductive connector 180 is formed integrally with the connected electrical conductor 130 and formed to be in contact with the conductive terminal 10 of the high voltage insulator when installed thereon.

In some embodiments, the electrically conductive connector 180 includes a damping component that is operable to receive and attach to the conductive terminal 10 of the high voltage insulator. Some embodiments provide that the damping component of the electrically conductive connector 180 includes a damping component 140 that is attached to the electrical insulator proximate the interior edges of the first and second surfaces and that engages the conductive terminal 10 of the high voltage insulator to maintain a position of the electrical insulator 110 relative to the conductive terminal 10 of the high voltage insulator. In some embodiments, the damping component 140 is electrically coupled to the connected electrical conductor 130 via the electrically conductive connector 180.

In some embodiments, the clamping component 140 may include a releasable clamp that is configured to be manipulated using conventional high-voltage tools such as, for example, an elongated insulated tool that may be referred to as a "hot stick". In this manner, the multi-purpose guard 100 may be installed on and/or removed from conductive terminals 10 of high-voltage insulators while energized.

Some embodiments provide that the guard 100 may be secured to the high-voltage conductor 10 using a compression type connector or tap. For example, a compression type connector may include one or more elements that, when compressed, created a secure coupling to the high-voltage conductor 10. In some embodiments, the compression type connector may include multiple elements that are compressed and/or deformed onto a high-voltage conductor 10 using a tool, such, as, for example, a powder actuated tool.

Figure 3B:
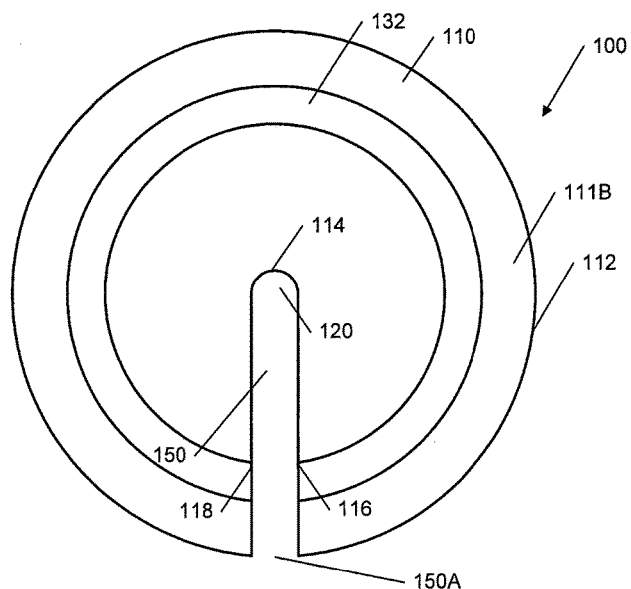
Figure 4:
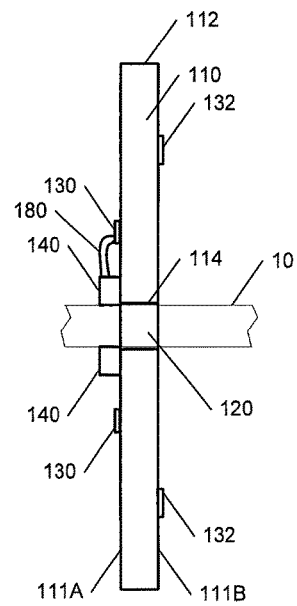
FIG. 4 is a cross-sectional side view of the apparatus of FIGS. 3A and 3B according to some embodiments of the present invention.

Reference is now made to FIGS. 3A and 3B, which are front and rear schematic views, respectively, of an apparatus according to some embodiments of the present invention and to FIG. 4, which is a cross-sectional side view of the apparatus of FIGS. 3A and 3B according to some embodiments of the present invention. As illustrated in FIG. 3A, the multi-purpose guard 100 may include the first surface 111A, the connected electrical conductor 130 and the electrically conductive connector 180, that is coupled to the connected electrical conductor 130.

Referring to FIG. 3B, the multi-purpose guard 100 may include a second surface 111B of the electrical insulator 110 and a floating electrical conductor 132 that is arranged in the second surface 111B of the electrical insulator 110 and that is spaced apart from the second edge 114. In some embodiments, the floating electrical conductor 132 may include an electrically conductive material including a metallic material and/or a conductive composite such as an electrically conductive plastic. Some embodiments provide that the floating electrical conductor 132 may be substantially monolithic in that the composition of the floating electrical conductor 132 includes the same material throughout. Some embodiments provide that the floating electrical conductor 132 may be attached to the electrical insulator 110 via one or more mechanical fastening techniques and/or one or more adhesive and/or bonding techniques.

In some embodiments, the floating electrical conductor 132 may include a conductive sheet, foil, textile, fabric and/or other electrically conductive structures. In some embodiments, the floating electrical conductor 132 may be a conductive composition that may be applied to the electrical insulator 110 using a spraying, rolling, printing, making, dipping and/or other material deposition and/or coating techniques. Some embodiments provide that the floating electrical conductor 132 includes a multiple strand floating electrical conductor such as a conductive braid and/or stranded conductor.

Although not illustrated, the floating electrical conductor 132 may be positioned in one or more recesses, cavities and/or channels formed in the electrical insulator 110. According to some embodiments, the floating electrical conductor 132 may be positioned on the second surface 111B of the electrical insulator 110 in the absence of recesses, cavities and/or channels therein.

As provided above, some embodiments of the electrical insulator 110 may include shapes other than the circular shapes illustrated herein. In some embodiments, the floating electrical conductor 132 may be arranged on the second surface 111B of the electrical insulator 110 in a geometric shape corresponding to the shape of the electrical insulator 110. In some embodiments, the floating electrical conductor 132 may be substantially annular and may be substantially centered about the conductive terminal 10 of the high-voltage insulator when installed thereon. Some embodiments provide that the arrangement of the floating electrical conductor 132 is different from the geometric shape of the electrical insulator 110.

In some embodiments, the floating electrical conductor 130 may be one or more elongated, thin strips of conductors. Some embodiments provide that the floating electrical conductor 132 may have a ratio of width to thickness in a range of about 1:1 to about 100:1. In some embodiments, the floating electrical conductor 132 may include a width in a range of about 0.125 inches to about 2 inches, however, such embodiments are non-limiting. For example, the floating electrical conductor 132 may have a width that is less than 0.125 inches and/or more than 2 inches within the scope and spirit of this disclosure. Some embodiments provide that the electrical conductor 132 may have a radial spacing from the central opening 120 in a range of about 3 inches to about 14 inches, however, such embodiments are non-limiting. For example, the radial spacing may be less than 3 inches and/or more than 14 inches.

Figure 13:
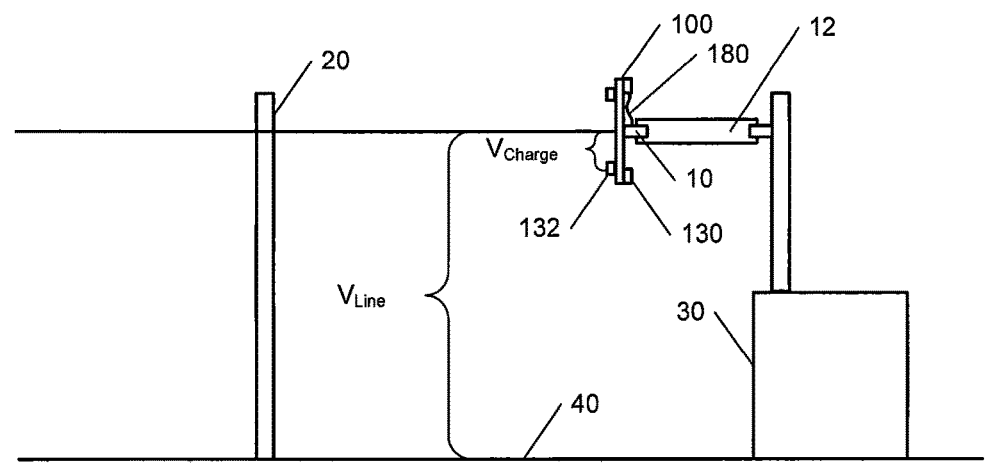
FIG. 13 is an elevation schematic diagram illustrating some embodiments of the present invention in an application in which embodiments disclosed herein may be used.

Reference is now made to FIG. 13, which is an elevation schematic diagram illustrating some embodiments of the present invention in an application in which a multi-purpose guard 100 may be used. A conductive terminal 10 of a high-voltage insulator may be supported by multiple support structures 20 the distances significantly above the earth ground 40. As used herein, a conductive terminal 10 of a high-voltage insulator may include any insulator conductive in a high-voltage electrical system. Conductive terminals 10 of high-voltage insulators may be used at electrical equipment 30, which may include a substation, switchgear, transformer, capacitor bank, and/or distribution terminal, among others. Some embodiments provide that the multi-purpose guard 100 may be installed on either and or both of the conductive terminals 10 of a high-voltage insulator. For example, as illustrated, it may be desirable to eliminate corona and prevent wildlife from traversing the high-voltage insulator to gain access to the electrical equipment 30. In this regard, the multi-purpose guard 100 may be positioned on both the high voltage conductive terminal and the grounded conductive terminal of the high voltage insulator.

As used herein, the term "high-voltage" may be used to refer to medium voltage, which is in a range of about 1 kV to about 75 kV, and high voltage, which is in a range of about 75 kV to about 230 kV.

In use and operation, the conductive terminal 10 of the high-voltage insulator may have significant electrical potential relative to the ground 40 that is illustrated as $V_{Line}$. Some embodiments provide that $V_{Line}$ may include voltages from 1 kV to 500 kV. In order to smooth the electric field distribution, the connected electrical conductor 130 may be electrically coupled to the high voltage conductive terminal 10 of the high voltage electrical insulator.

The floating electrical conductor 132 of the multi-purpose guard 100 may gain electrostatic charge from the electric field between the ground 40 and the high-voltage conductor 10. Stated differently, the floating electrical conductor 132 may gain electrostatic charge from the capacitance between the high-voltage conductor 10 and the ground 40. As a result, the floating electrical conductor 130 may have an electrical potential difference of voltage $V_{Charge}$ that is less than $V_{Line}$. When an animal approaching the conductive terminal 10 of the high-voltage insulator attempts to traverse the multi-purpose guard 100, contact with both the high-voltage conductor and the floating electrical conductor 132 delivers a small electrical shock corresponding to voltage $V_{Charge}$. Based on the small electrical shock, the animal may be deterred from further attempting to traverse the multi-purpose guard 100. Some embodiments provide that the shock may not be harmful to the animal, but may be significantly annoying to create a conditioned response in the animal that further prevents the animal from climbing on the high-voltage system components and/or electrical equipment 30.

In some embodiments, a distance of the floating electrical conductor 132 from a conductive terminal 10 of a high-voltage insulator may be determined by the operating voltage of the system and/or by a size range of wildlife that the multi-purpose guard 100 is intended to deter. For example, in the context of a planar, circular-shaped multi-purpose guard 100, a radius of the floating electrical conductor 132 may be different for different applications and/or environments. Some embodiments of the present invention may address this issue by providing multiple floating electrical conductors 132 on the electrical insulator 110. In this regard, multiple substantially concentric floating electrical conductors 132 may be provided on the second surface 111B.

In some embodiments, the multi-purpose guard 100 may include a first floating electrical conductor 132 that is spaced at a first radial distance from the central opening 120 and a second floating electrical conductor that is spaced at a second radial distance from the central opening, such that the second radial distance is further than the first radial distance. For example, some embodiments provide that the first and second conductors may be arranged as substantially concentric rings. The first floating electrical conductor 132 may develop a first voltage relative to the conductive terminal 10 of the high-voltage insulator and the second floating electrical conductor may develop a second voltage relative to the conductive terminal 10 of the high voltage insulator that is different from the first voltage. In this manner, an animal contacting any two of the conductive terminal 10 on the high-voltage insulator, the first floating electrical conductor 132 and the second floating electrical conductor may receive an electrical shock based on the voltage differences therebetween. Although described as two different floating electrical conductors, the invention is not so limited. For example, a multi-purpose guard 100 according to embodiments disclosed herein may include three or more floating electrical conductors.

Figure 5:
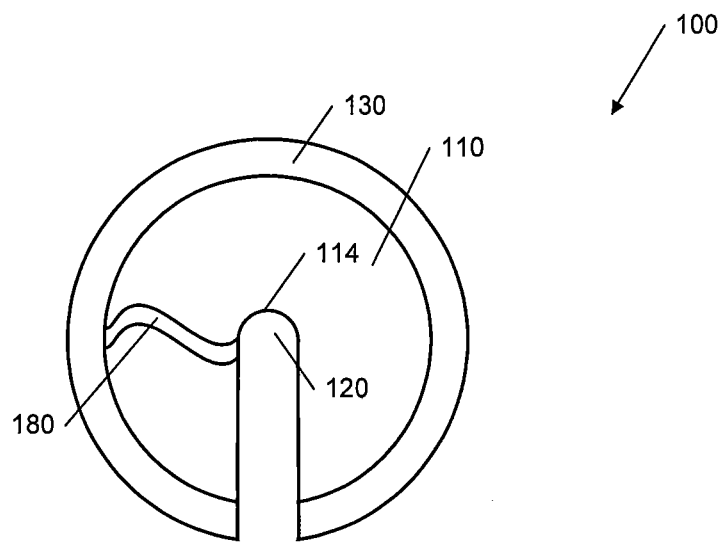
FIG. 5 is front schematic view of an apparatus according to some embodiments of the present invention.
Figure 6:
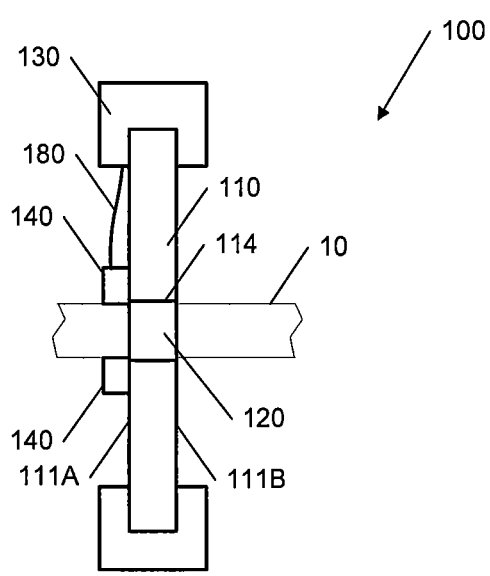
FIG. 6 is a cross-sectional side view of the apparatus of FIG. 5 according to some embodiments of the present invention.

Reference is now made to FIG. 5, which is a front schematic view of a multi-purpose guard according to some embodiments of the present invention and to FIG. 6, which is a cross-sectional side view of the guard of FIG. 5 according to some embodiments of the present invention. As illustrated, some embodiments provide that a guard 100 may include a connected electrical conductor 130 that is positioned at the first edge 112 of the electrical insulator 110. In some embodiments, the connected electrical conductor 130 may be only on the first surface 111A of the electrical insulator 110. Some embodiments provide that the connected electrical conductor 130 may be only on the first edge 112 and not on ones of either of the first and/or second surfaces 111A, 111B. Some embodiments provide that the connected electrical conductor 130 may be on the first surface 111A, the first edge 112 and the second surface 111B. For example, some embodiments provide that the connected electrical conductor 130 is a channel that may be formed along the first edge 112. Some embodiments provide that the connected electrical conductor 130 is a flexible conductive device that may include multiple conductors that may be a fabric and/or woven and/or braided together.

Some embodiments provide that the solid nature and/or geometry of the electrical insulator 110 may be a wildlife deterrent based on the difficulty of traversing the device. In some embodiments, a floating electrical conductor (not illustrated here) may also be provided on a second surface 111B of the electrical insulator. In some embodiments, the floating electrical conductor and the connected electrical conductor may be on the same surface of the electrical insulator 110. In this manner, the floating electrical conductor 132 may provide an electrostatic charge to unwanted wildlife attempting to traverse the system and the connected electrical connector 130 may prevent corona and/or other unwanted consequences of significant changes in electric field distribution.

Figure 7:
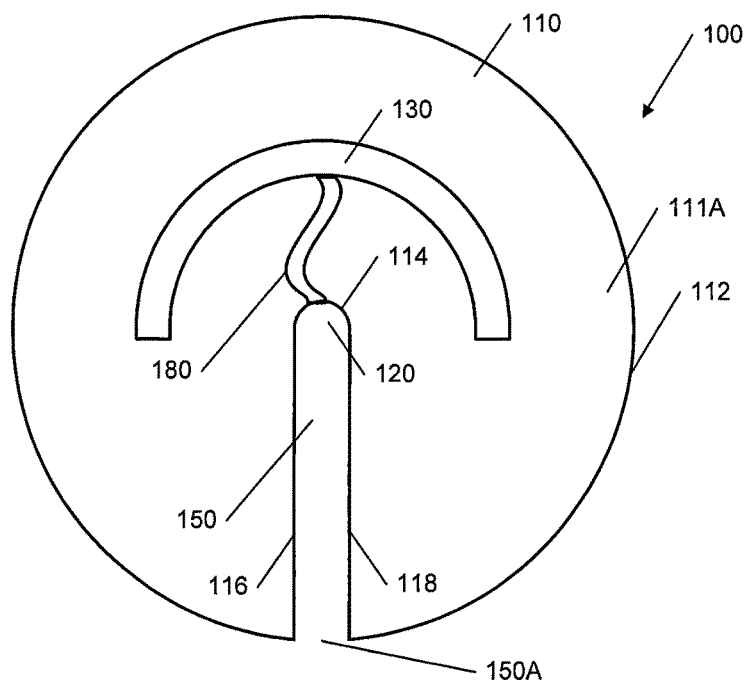
FIG. 7 is front schematic view of an apparatus according to some embodiments of the present invention.
Figure 8:
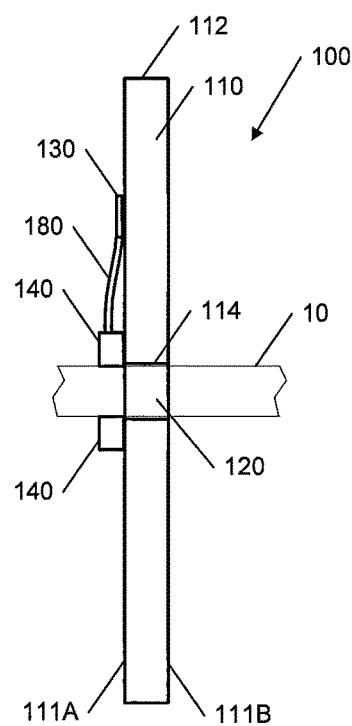
FIG. 8 is a cross-sectional side view of the apparatus of FIG. 7 according to some embodiments of the present invention.

Reference is now made to FIG. 7, which is front schematic view of an apparatus according to some embodiments of the present invention and to FIG. 8, which is a cross-sectional side view of the apparatus of FIG. 7 according to some embodiments of the present invention. As illustrated in FIG. 7, the connected electrical conductor 130 may be positioned and/or arranged to be present on only a specific axial portion of the first surface 111A of the electrical insulator 110. For example, the connected electrical conductor 130 may be only on some fraction of a circle in a plane corresponding to the first surface 111A. As illustrated, the connected electrical conductor 130 corresponds to about one half of a circle. In some embodiments, the connected electrical conductor may be more than about one half of a circle, while some embodiments provide that the connected electrical connector corresponds to less than one half of a circle. Some embodiments provide that the geometry is not circular and that the connected electrical connector is some portion of an underlying shape. For example, the connected electrical conductor 130 may comprise a series of elongated substantially linear conductor segments that are electrically connected to one another.

Figure 9:
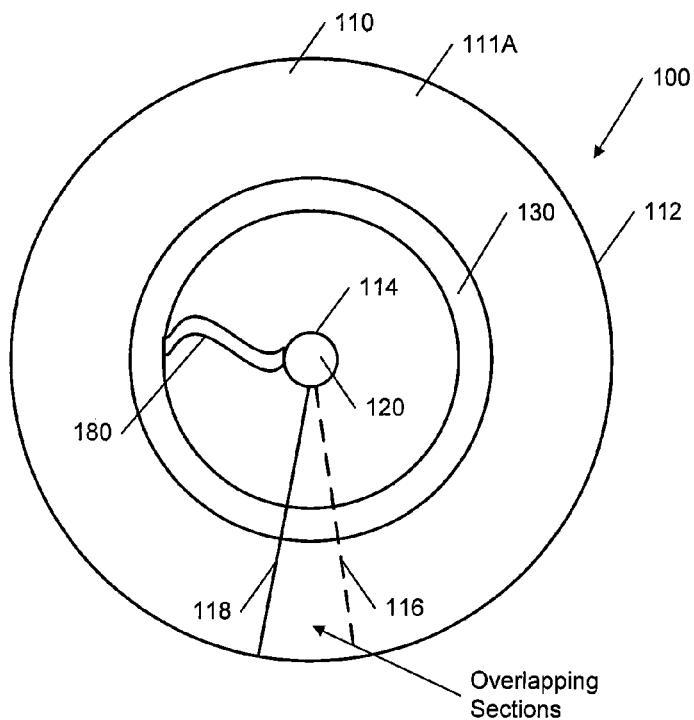
FIG. 9 is front schematic view of an apparatus according to some embodiments of the present invention.
Figures 10, 11:
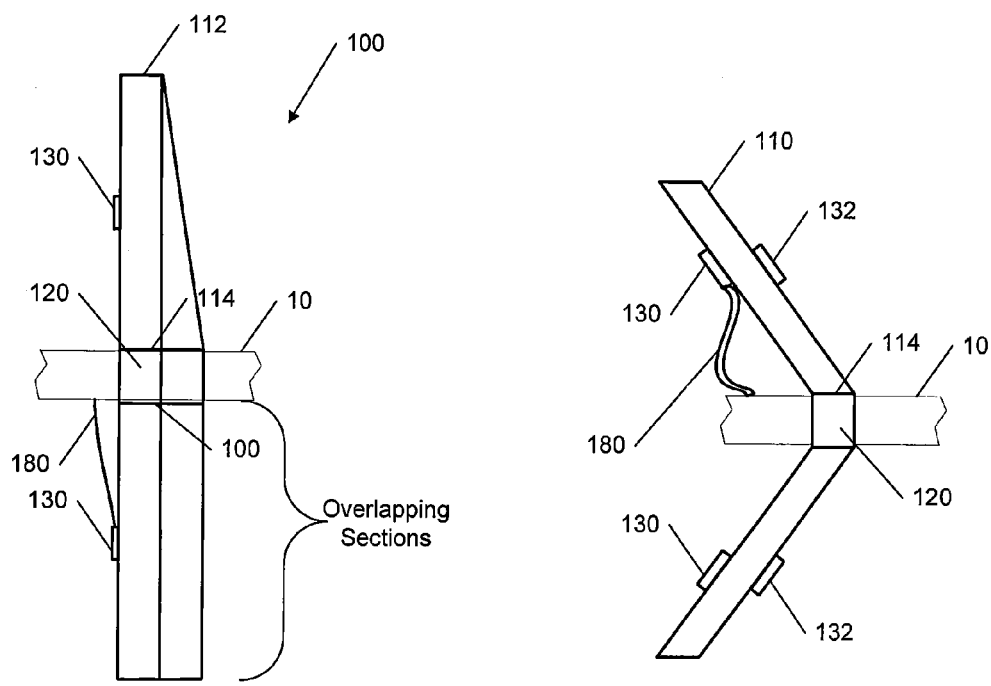
FIG. 10 is a cross-sectional side view of the apparatus of FIG. 9 according to some embodiments of the present invention.
FIG. 11 is a cross-sectional side view of an apparatus according to further embodiments of the present invention.

Reference is now made to FIG. 9, which is front schematic view of an apparatus according to some embodiments of the present invention and to FIG. 10, which is a cross-sectional side view of the apparatus of FIG. 9 according to some embodiments of the present invention. In some embodiments, the third edge 116 overlaps the first surface 111B and the fourth edge 118 overlaps the second surface such that between the third and the fourth edges, the first and second surfaces 111A, 111B are facing one another and may be in contact with one another by virtue of the resiliency of the electrical insulator 110. In some embodiments, instead of a clamping component, the overlapping portions of the electrical insulator 110 may be used to retain the multi-purpose guard 100 on the high-voltage conductor 10. Installation of the multi-purpose guard 100 may be accomplished by compelling the high-voltage conductor 10 towards the central opening 120 between the overlapping portions of the electrical insulator 110 with the conductive terminal 10 of the high-voltage insulator and the gap between the overlapping portions being substantially parallel to one another during installation. Once the conductive terminal 10 of the high-voltage insulator is proximate the central opening 120, the multi-purpose guard 100 may be rotated to be substantially perpendicular to the conductive terminal 10 of the high-voltage insulator.

Brief reference is now made to FIG. 11, which is a cross-sectional side view of an apparatus according to further embodiments of the present invention. Some embodiments provide that the electrical insulator 110 is substantially non-planar. For example, the electrical insulator 110 may include a conical, curvilinear, hemi-spherical, parabolic, and/or ribbed cross-sectional shape, among others. Some embodiments provide a multi-purpose guard 100 that may include a connected electrical conductor 130 on a first surface of the electrical insulator 110 and a floating electrical conductor 132 on a second surface of the electrical insulator 110 that is opposite the first surface.

Figure 12:
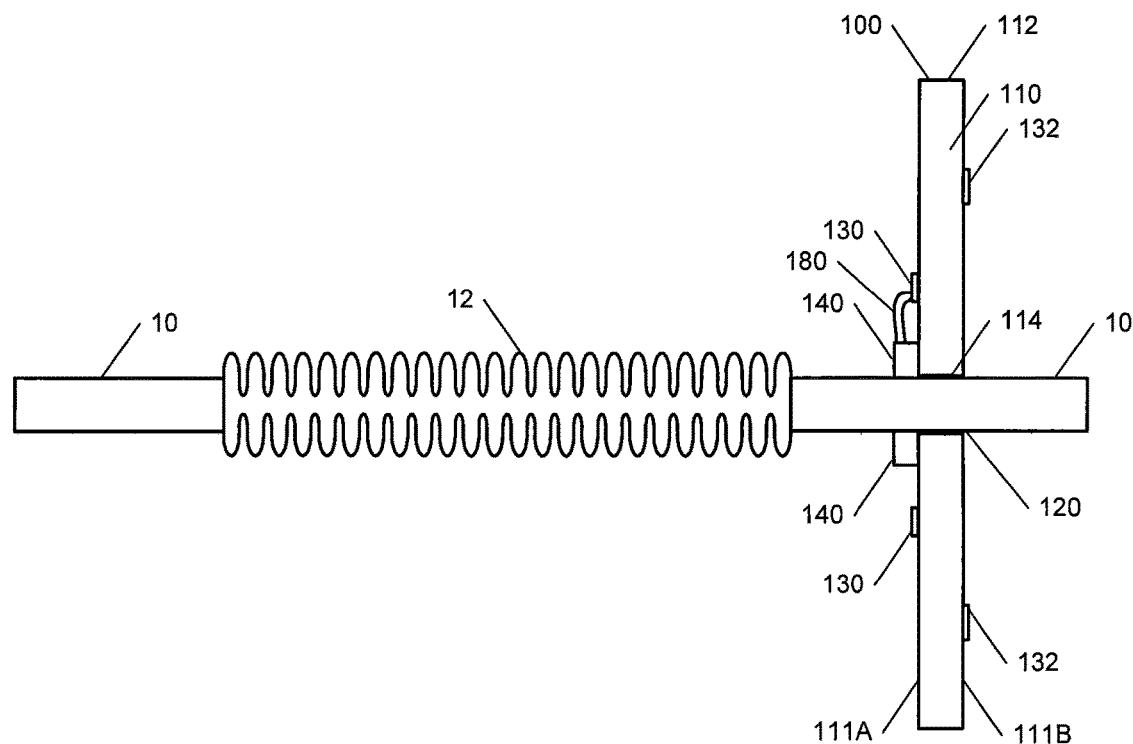
FIG. 12 is a cross-sectional side view of an apparatus installed on a high voltage insulator according to some embodiments of the present invention.

Brief reference is now made to FIG. 12, which is a cross-sectional side view of an apparatus installed on a high voltage insulator according to some embodiments of the present invention. As illustrated, the multi-purpose guard 100 includes an electrical insulator 110 having a first surface 111A and a second surface 111B. A connected electrical conductor 130 on the electrical insulator 110 is electrically coupled to a conductive terminal 10 of a high-voltage insulator 12 via electrically conductive connector 180 that may include a clamping component 140. A floating electrical conductor 132 may be arranged on the electrical insulator 110 and be configured to be electrostatically charged by the difference between the voltage of an energized conductive terminal 10 of the high voltage electrical insulator 12.

Reference is now made to FIG. 14, which is an elevation schematic diagram illustrating some embodiments of the present invention in an application in which an apparatus disclosed herein may be used. Conductive terminals 10 of a high-voltage insulator 12 may be supported by multiple support structures 20 at distances significantly above the earth ground 40. As used herein, a conductive terminal 10 of a high-voltage insulator may include any insulator conductor in a high-voltage electrical system. Conductive terminals 10 of high-voltage insulators may be used at support structures 20 and/or electrical equipment 30, which may include a substation, switchgear, transformer, capacitor bank, and/or distribution terminal, among others. Some embodiments provide that the multi-purpose guard 100 may be installed on either and/or both of the conductive terminals 10 of a high-voltage insulator 12. For example, as illustrated, it may be desirable to eliminate corona and prevent wildlife from traversing the high-voltage insulator 12 to gain access to the support structure 20. In this regard, the multi-purpose guard 100 may be positioned on both the high voltage conductive terminal and the grounded conductive terminal of the high voltage insulator 12.

Figure 15A:
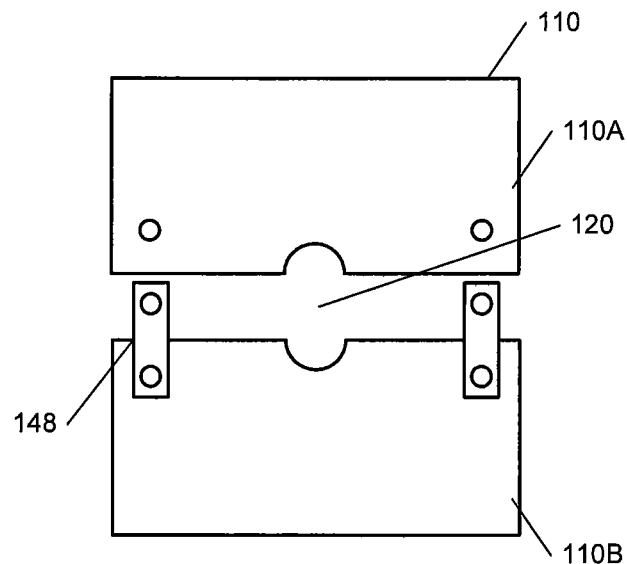
FIGS. 15A and 15B are front schematic views of an electrical insulator that may be used in an electrostatic wildlife guard according to some embodiments of the present invention in unattached and attached configurations, respectively.
Figure 15B:
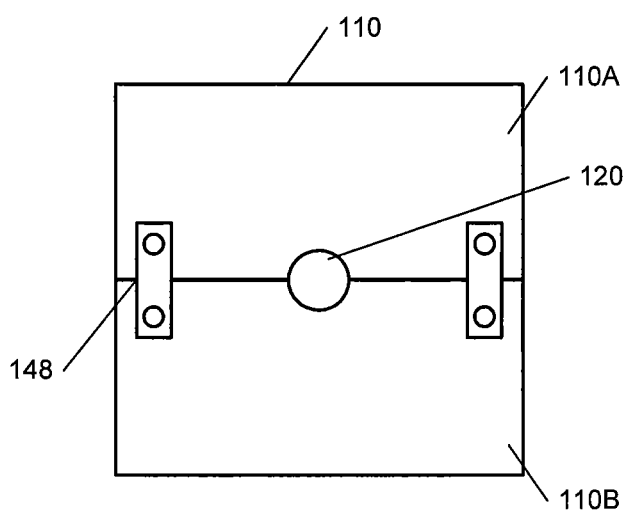

Reference is now made to FIGS. 15A and 15B, which are front schematic views of an electrical insulator 110 that may be used in an electrostatic wildlife guard according to some embodiments of the present invention in unattached and attached configurations, respectively. In some embodiments, an electrical insulator 110 may include a first insulator structure 110A that includes the first surface and the second surface and a second insulator structure 110B that includes the first surface and the second surface. As illustrated in FIG. 15A, the first and second insulator structures 110A, 1.10E are not coupled to one another. Referring to FIG. 15B, the first and second insulator structures 110A, 110B may be coupled to one another using one or more insulator couplers 148

In some embodiments, an insulator coupler 148 may include an electrically insulating and/or electrically conductive materials therein. Some embodiments provide that the insulator coupler 148 may include any mechanical means for mechanically attaching the first and second insulator structures 110A, 110B to one another.

When coupled to one another, the first and second insulator structures 110A, 110B may define a central opening 120 that may be configured to receive the high-voltage conductor 10. Although the first electrical insulator 110A is illustrated as having the same shape as the second insulator structure 110B, the inventive concept is not so limiting. For example, the first insulator structure 110A may include a shape that is different from the second insulator structure 110B. For example, the first insulator structure 110A may define a cavity and/or gap that the second insulator structure is configured to substantially fill when coupled to the first insulator structure 110A.

Although the first and second electrical insulators 110A, 110B are illustrated as having a polygonal shape, the inventive concept is not so limiting. For example, the first and/or second insulator structures 110A, 110B may include a generally circular and/or curved shape. Some embodiments provide that the first insulator structure 110A may include a generally circular shape having a generally a pie-shaped gap. In such embodiments, the second insulator structure 110B may include a generally pie-shape that is configured to be substantially complementary to the first insulator structure 110A.

A conventional corona ring installed on a high voltage insulator may include a metallic corona ring mounted to a conductive terminal of the high voltage insulator. The conventional corona ring 16 provides no protection against wildlife traversing the electrical distribution system and/or equipment thereof.

Figure 16:
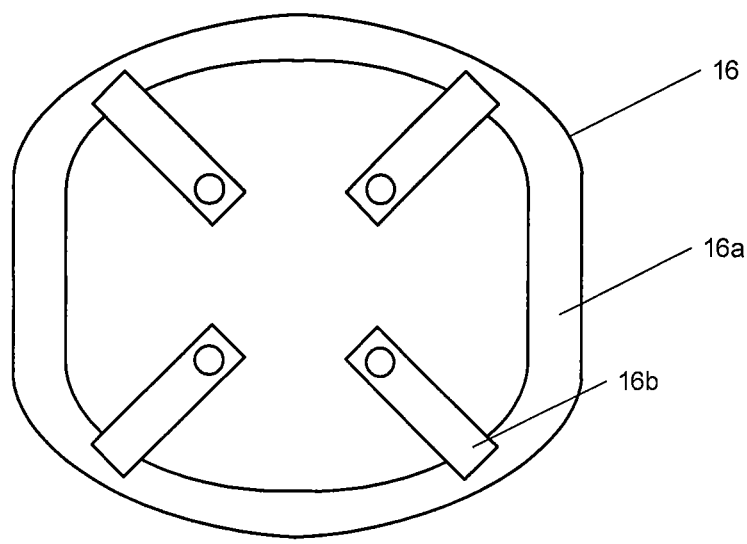
FIG. 16 is a schematic diagram of an example of a conventional corona ring.

Reference is now made to FIG. 16, which is a schematic diagram of an example of a conventional corona ring. As illustrated, the corona ring 16 includes a generally curved section 16a that is configured to be mounted to high voltage equipment via mounting brackets 16b. As illustrated and in contrast with embodiments disclosed herein, the mounting brackets 16 of the conventional corona ring 16 may include edges and the like that may provide charge accumulation areas that may add corona to the lines. Additionally, manufacturing of the conventional corona ring 16 may be substantially more involved than that of embodiments disclosed herein.

A conventional corona ring installed in a high voltage electrical distribution system may include multiple metallic corona rings mounted to conductive structures proximate a high voltage insulator. The conventional corona ring provides no protection against wildlife traversing the electrical distribution system and/or equipment thereof.

An apparatus as disclosed herein installed on a high voltage insulator according to some embodiments of the present invention may include the multi-purpose guard attached to a conductive terminal of a high voltage electrical insulator. For example, a multi-purpose guard includes the electrical insulator, the connected electrical conductor and the clamping component.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the embodiments disclosed herein, and that modifications to the disclosed embodiments, as well as other embodiments, are intended to be included within the scope of the appended claims. The present invention is defined by the following claims.

What is claimed is:

1. An apparatus for mounting at a conductive terminal of a high voltage insulator, the apparatus comprising:
    an electrical insulator including an electrically insulating material without a conductive material, the electrical insulator comprising:
        a first surface;
        a second surface that is opposite the first surface;
        a first edge that is between the first surface and the second surface, an intersection between the first edge and the first and second surfaces defining outer edges of the first and second surfaces, respectively; and
        a second edge that is opposite the first edge and that is between the first surface and the second surface, an intersection between the second edge and the first and second surfaces defining interior edges of the first and second surfaces, respectively;
    a connected electrical conductor that is arranged on the first surface of the electrical insulator and is spaced apart from the second edge; and
    an electrically conductive connector that is configured to electrically couple the connected electrical conductor to the conductive terminal of the high voltage insulator.

2. The apparatus according to claim 1, further comprising a floating electrical conductor that is on the second surface and that is spaced apart from the second edge.

3. The apparatus according to claim 2,
    wherein the first edge defines a first shape, and
    wherein the floating electrical conductor that is arranged on the second surface of the electrical insulator includes a second shape that is the same as the first shape.

4. The apparatus according to claim 1, wherein the interior edges of the electrical insulator define a central opening that is configured to receive the conductive terminal of the high voltage insulator.

5. The apparatus according to claim 1, wherein the first surface of the electrical insulator is substantially planar.

6. The apparatus according to claim 1, wherein the first surface of the electrical insulator is substantially non-planar.

7. The apparatus according to claim 1, wherein the first edge defines a first shape that includes a circular and/or polygonal shape.

8. The apparatus according to claim 1, further comprising a clamping component that is attached to the electrical insulator proximate the interior edges of the first and second surfaces and that engages the conductive terminal of the high voltage conductor to maintain a position of the electrical insulator relative to the conductive terminal of the high voltage conductor.

9. The apparatus according to claim 1, wherein the electrical insulator further comprises:
    a third edge that is between a proximal end of the first edge and a proximal end of the second edge and that is between the first surface and the second surface; and a fourth edge that is between a distal end of the first edge and a distal end of the second edge and that is between the first surface and the second surface.

10. The apparatus according to claim 9, wherein a gap is formed between the third edge and the fourth edge, and
wherein the gap is in fluidic communication with a central opening that is defined by the interior edges of the electrical insulator.

11. The apparatus according to claim 9, wherein the third edge overlaps the first surface and the second edge overlaps the second surface, and
wherein the first surface is proximate the second surface in a portion between where the third edge overlaps the first surface and the second edge overlaps the second surface.

12. The apparatus according to claim 1, wherein the connected electrical conductor is on the first edge.

13. The apparatus according to claim 1, wherein the connected electrical conductor comprises a conductive plastic material.

14. The apparatus according to claim 1, wherein the connected electrical conductor is a conductive coating that is applied to the first surface of the electrical insulator.

15. The apparatus according to claim 1, wherein the electrically conductive connector comprises a multiple strand electrical conductor.

16. The apparatus according to claim 1, wherein the electrically conductive connector comprises a clamping component that is attached to the electrical insulator proximate the interior edges of the first and second surfaces and that engages the conductive terminal of the high voltage conductor to maintain a position of the electrical insulator relative to the conductive terminal of the high voltage conductor,
wherein the clamping component is electrically coupled to the connected electrical conductor.

17. The apparatus according to claim 1, wherein the first surface of the electrical insulator comprises a first axially defined portion and a second axially defined portion, and
wherein the connected electrical conductor is arranged within the first axially defined portion without extending into the second axially defined portion.

18. The apparatus according to claim 17, wherein the first axially defined portion comprises an area including a range of about 30 percent of the first surface to about 70 percent of the first surface.

19. The apparatus according to claim 17, wherein the first axially defined portion and the second axially defined portion comprise a total area of the first surface.

20. The apparatus according to claim 1, wherein the electrical insulator comprises:
a first insulator structure that includes the first surface and the second surface;
a second insulator structure that includes the first surface and the second surface; and
an insulator coupler that is configured to attach the first insulator structure to the second insulator structure,
wherein the high-voltage electrical conductor is between the first insulator structure and the second insulator structure when the apparatus is installed thereon.

* * * * *